United States Patent
He et al.

(10) Patent No.: US 7,653,129 B2
(45) Date of Patent: Jan. 26, 2010

(54) METHOD AND APPARATUS FOR PROVIDING INTRA CODING FRAME BIT BUDGET

(75) Inventors: Yong He, San Diego, CA (US); Siu-Wai Wu, San Diego, CA (US); Jing Yang Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 909 days.

(21) Appl. No.: 11/023,775

(22) Filed: Dec. 28, 2004

(65) Prior Publication Data
US 2006/0140267 A1 Jun. 29, 2006

(51) Int. Cl.
*H04N 7/12* (2006.01)
(52) U.S. Cl. ............ 375/240.03; 375/240; 375/240.01; 375/240.12
(58) Field of Classification Search ................ 375/240, 375/240.01, 240.02, 240.05, 240.12, 240.03; 348/390.1
See application file for complete search history.

(56) References Cited

U.S. PATENT DOCUMENTS 5,764,293 A * 6/1998 Uz et al. .................. 348/390.1
6,160,846 A * 12/2000 Chiang et al. .......... 375/240.05

* cited by examiner

*Primary Examiner*—Allen Wong
(74) *Attorney, Agent, or Firm*—Larry T. Cullen

(57) ABSTRACT

The present invention discloses a system and method for adaptive adjustment of bit budget that favors the allocation of bits to intra coding frames (I frames). Namely, an encoder is able to dynamically adjust the bit budget for each picture type in an image sequence, thereby effecting proper usage of the available transmission bandwidth and improving the picture quality. In one embodiment, the present invention will allocate more encoding bandwidth to a current Intra coding frame when the average quantization level of inter coding frames (e.g., P and B frames) of a previous group of pictures is relatively high.

20 Claims, 2 Drawing Sheets

METHOD AND APPARATUS FOR PROVIDING INTRA CODING FRAME BIT BUDGET

BACKGROUND OF THE INVENTION

1. Field of the Invention

Embodiments of the present invention generally relate to an encoding system. More specifically, the present invention relates to an encoding system where bit budget can be adaptively adjusted for intra coded frames.

2. Description of the Related Art

Demands for lower bit-rates and higher video quality requires efficient use of bandwidth. To achieve these goals, the Moving Picture Experts Group (MPEG) created the Moving Picture Experts Group (MPEG) created the ISO/IEC international Standards 11172 (1991) (generally referred to as MPEG-1 format) and 13818 (1995) (generally referred to as MPEG-2 format), which are incorporated herein in their entirety by reference. One goal of these standards is to establish a standard coding/decoding strategy with sufficient flexibility to accommodate a plurality of different applications and services such as desktop video publishing, video telephone, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms in areas such as image pre-processing, motion estimation, coding mode decisions, scalability, rate control and scan mode decisions.

In the area of rate control, MPEG does not define a specific algorithm for controlling the bit rate of an encoder. It is the task of the encoder designer to devise a rate control process for controlling the bit rate such that the decoder input buffer neither overflows nor underflows. A fixed-rate channel is assumed to carry bits at a constant rate to an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the encoder to monitor the number of bits generated by the encoder, thereby preventing the overflow and underflow conditions.

Currently, one way of controlling the bit rate is to alter the quantization process, which will affect the distortion of the input video image. By altering the quantizer scale (step size), the bit rate can be changed and controlled.

Although changing the quantizer scale is an effective method of implementing the rate control of an encoder, it has been shown that a poor rate control process will actually degrade the visual quality of the video image, i.e., failing to alter the quantizer scale in an efficient manner such that it is necessary to drastically alter the quantizer scale toward the end of a picture to avoid overflow and underflow conditions.

Since altering the quantizer scale affects both image quality and compression efficiency, it is important for a rate control process to control the bit rate without sacrificing image quality.

To illustrate, at low bit rate MPEG-2 compression, there are scenarios where there may not be sufficient bits available to encode the DCT coefficients. Therefore, details in the picture are often lost due to over-quantization.

Thus, there is a need in the art for an encoding system and method that can dynamically adjust the bit budget while maintaining image quality and compression efficiency.

SUMMARY OF THE INVENTION

In one embodiment, the present invention discloses a system and method for adaptive adjustment of bit budget that favors the allocation of bits to intra coding frames (I frames). Namely, an encoder is able to dynamically adjust the bit budget for each picture type in an image sequence, thereby effecting proper usage of the available transmission bandwidth and improving the picture quality.

In one embodiment, the present invention will allocate more encoding bandwidth to a current Intra coding frame when the average quantization level of inter coding frames (e.g., P and B frames) of a previous group of pictures (GOP) is relatively high. In other words, as the rate control detects that the quantization levels for the P and B frames in a previous GOP is increasing, it will attempt to allocate more bits to the I frame in a current GOP. With the same group of pictures (GOP) encoding bit rate, assigning more bandwidth to the intra coding frame helps to preserve more high frequency details, thereby preserving the sharpness and clarity of the pictures in the image sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

It should be noted that although the present invention is described within the context of MPEG-2, the present invention is not so limited. Namely, the present motion compensated encoder can be an MPEG-2 compliant encoder or an encoder that is compliant to any other compression standards, e.g., MPEG-4, H.261, H.263 and so on. In other words, the present invention can be applied to any other compression standards that allow a flexible rate control implementation.

In motion compensated encoding, there are generally three types of pictures or frames that can be used in the coding method. The three types of pictures or frames are intra coding (I) pictures or frames, predicted coding (P) pictures or frames, and bi-predicted coding (B) pictures or frames. P and B frames are broadly defined as inter coding frames because they are encoded using other frames, e.g., one or more I, P, or B frames that have already been encoded as a reference frame. The reference frame can be in either the forward or backward temporal direction in relation to the picture that is being encoded. In contrast, an I frame is encoded without the need of other reference frames.

Figure 1:
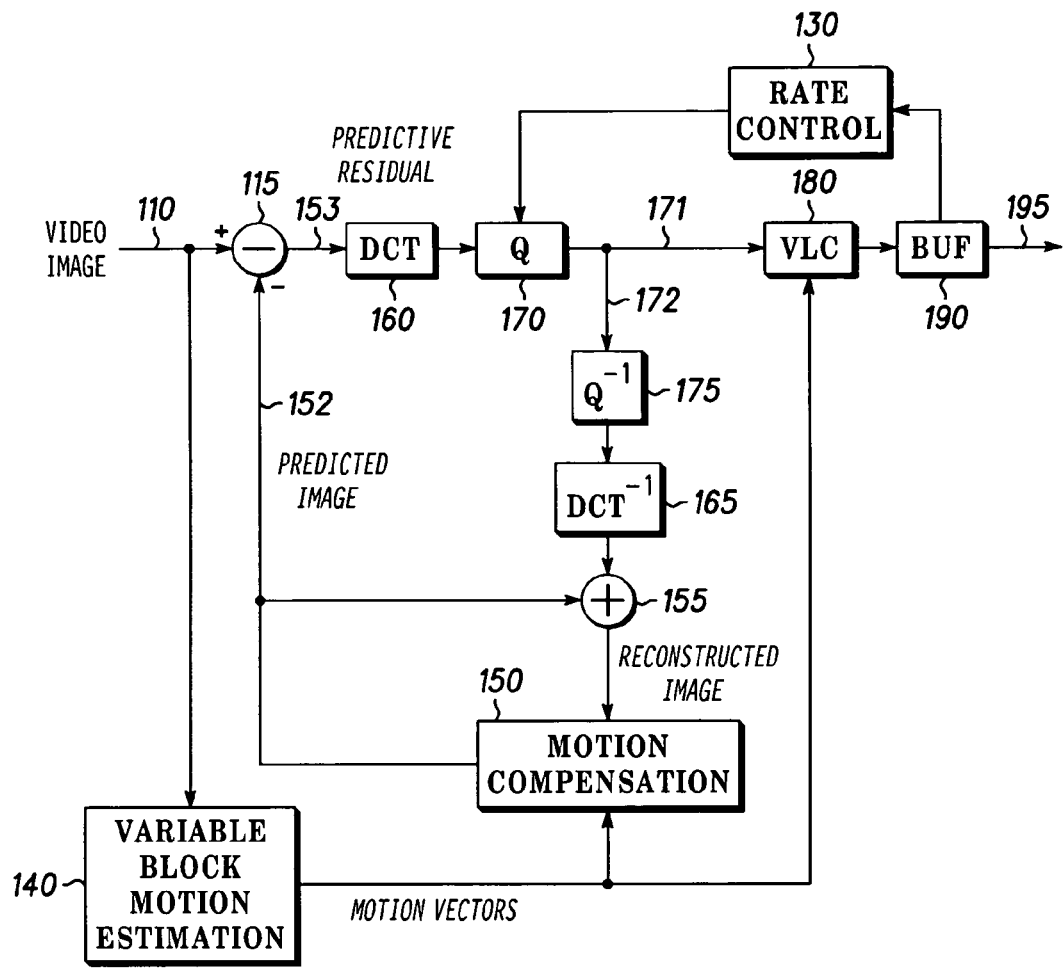
FIG. 1 illustrates a motion compensated encoder of the present invention.

FIG. 1 depicts a block diagram of an exemplary motion compensated encoder 100 of the present invention. In one embodiment of the present invention, the apparatus 100 is an encoder or a portion of a more complex variable block-based motion compensation coding system. The apparatus 100 comprises a variable block motion estimation module 140, a motion compensation module 150, a rate control module 130, a discrete cosine transform (DCT) module 160, a quantization (Q) module 170, a variable length coding (VLC) module 180, a buffer (BUF) 190, an inverse quantization ($Q^{-1}$) module 175, an inverse DCT ($DCT^{-1}$) transform module 165, a subtractor 115 and a summer 155. Although the apparatus 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) on path 110 which is digitized and represented as a luminance and two color difference signals ($Y$, $C_r$, $C_b$) in accordance with the MPEG standards. These signals are further divided into a plurality of layers (sequence, group of pictures, picture, slice and blocks) such that each picture (frame) is represented by a plurality of blocks having different sizes. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image on path 110 is received into variable block motion estimation module 140 for estimating motion vectors. The motion vectors from the variable block motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame.

Furthermore, prior to performing motion compensation prediction for a given block, a coding mode must be selected. In the area of coding mode decision, MPEG provides a plurality of different coding modes. Generally, these coding modes are grouped into two broad classifications, inter mode coding and intra mode coding. Intra mode coding involves the coding of a block or picture that uses information only from that block or picture. Conversely, inter mode coding involves the coding of a block or picture that uses information both from itself and from blocks and pictures occurring at different times. Specifically, MPEG-2 provides coding modes which include intra mode, no motion compensation mode (No MC), frame/field/dual-prime motion compensation inter mode, forward/backward/average inter mode and field/frame DCT mode. The proper selection of a coding mode for each block will improve coding performance. Again, various methods are currently available to an encoder designer for implementing coding mode decision.

Once a coding mode is selected, motion compensation module 150 generates a motion compensated prediction (predicted image) on path 152 of the contents of the block based on past and/or future reference pictures. This motion compensated prediction on path 152 is subtracted via subtractor 115 from the video image on path 110 in the current block to form an error signal or predictive residual signal on path 153. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, predictive residual signal on path 153 is passed to the DCT module 160 for encoding.

The DCT module 160 then applies a forward discrete cosine transform process to each block of the predictive residual signal to produce a set of eight (8) by eight (8) blocks of DCT coefficients. The number of 8×8 blocks of DCT coefficients will depend upon the size of each block. The discrete cosine transform is an invertible, discrete orthogonal transformation where the DCT coefficients represent the amplitudes of a set of cosine basis functions. One advantage of the discrete cosine transform is that the DCT coefficients are uncorrelated. This decorrelation of the DCT coefficients is important for compression, because each coefficient can be treated independently without the loss of compression efficiency. Furthermore, the DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

Next, the resulting 8×8 block of quantized DCT coefficients is received by variable length coding module 180 via signal connection 171, where the two-dimensional block of quantized coefficients is scanned using a particular scanning mode, e.g., a "zig-zag" order to convert it into a one-dimensional string of quantized DCT coefficients. For example, the zig-zag scanning order is an approximate sequential ordering of the DCT coefficients from the lowest spatial frequency to the highest. Since quantization generally reduces DCT coefficients of high spatial frequencies to zero, the one-dimensional string of quantized DCT coefficients is typically represented by several integers followed by a string of zeros.

Variable length coding (VLC) module 180 then encodes the string of quantized DCT coefficients and all side-information for the block such as block type and motion vectors. The VLC module 180 utilizes variable length coding and run-length coding to efficiently improve coding efficiency. Variable length coding is a reversible coding process where shorter code-words are assigned to frequent events and longer code-words are assigned to less frequent events, while run-length coding increases coding efficiency by encoding a run of symbols with a single symbol. These coding schemes are well known in the art and are often referred to as Huffman coding when integer-length code words are used. Thus, the VLC module 280 performs the final step of converting the input video image into a valid data stream.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 is a compressed representation of the input video image 110, where it is sent to a storage medium or telecommunication channel on path 195.

The rate control module 130 serves to monitor and adjust the bit rate of the data stream entering the FIFO buffer 190 for preventing overflow and underflow on the decoder side (within a receiver or target storage device, not shown) after transmission of the data stream. A fixed-rate channel is assumed to put bits at a constant rate into an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. Rate control algorithms play an important role in affecting image quality and compression efficiency.

In one embodiment, the proper adjustment of the bit budget for each picture of an input image sequence in the rate control module 130 is determined in accordance with the method of the present invention. Specifically, the bit budget for an I frame in a GOP will be allocated more bits if the average quantization level for inter coding frames is greater than a predefined level.

Figure 2:
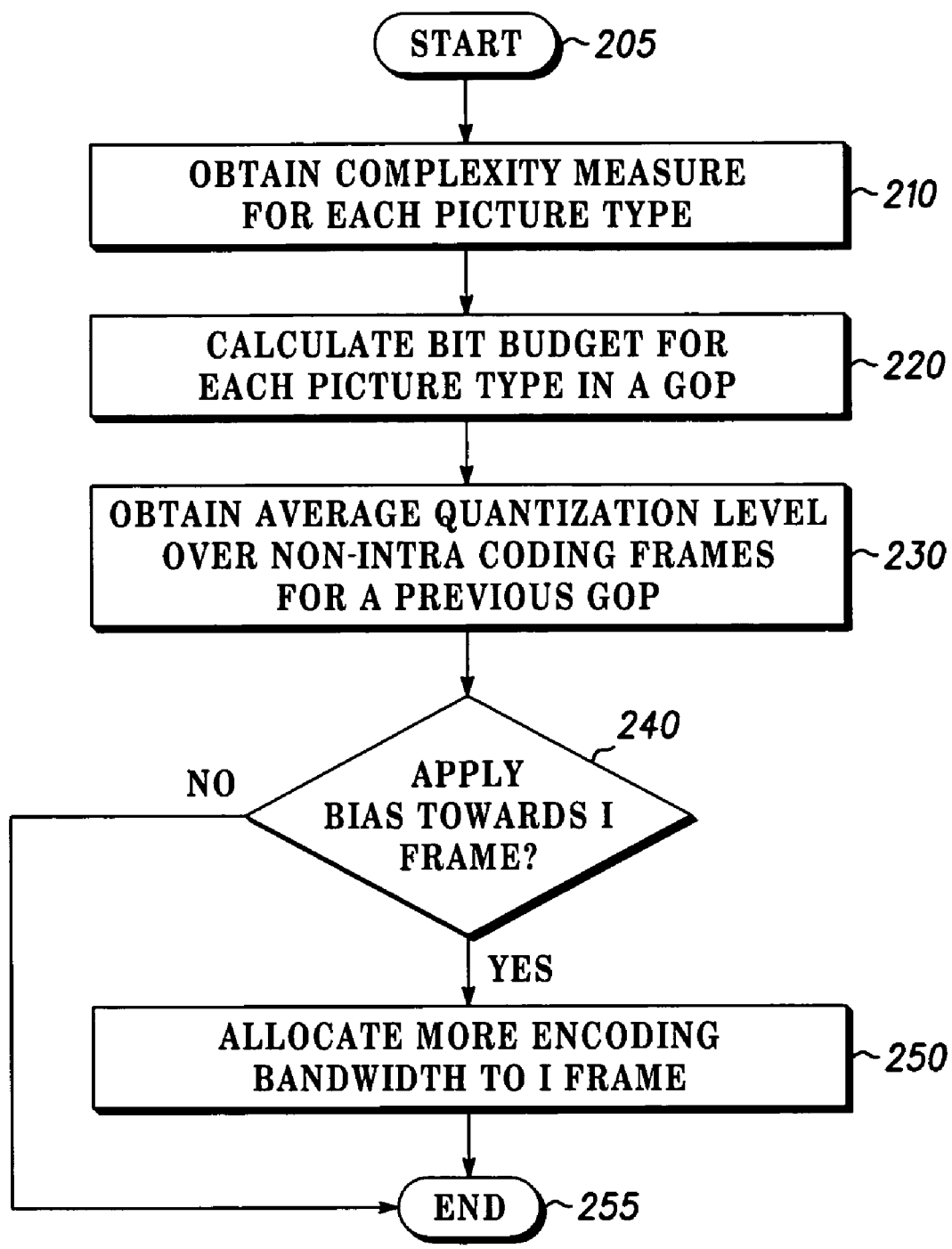
FIG. 2 illustrates a method for adjusting the bit budget of the present invention.

FIG. 2 illustrates a method 200 for adjusting the bit budget of the present invention. In one embodiment, the present method uses previously non-intra coded (P and B) frames' average quantization level (QL) as a criterion to determine a bias factor for the Intra coding frame (I frame) bit budget. In generally, higher QL value indicates the residue activity is higher for P and B frames. As such, it is becoming more difficult to compress the P and B frames efficiently due to the limited bandwidth. Therefore, more high frequency details would be lost by higher quantization which may result in blurred pictures. In the present invention, rather than assigning more bandwidth to P and B frames, it is more beneficial to allocate more bandwidth to I frame so that the residue activities of following P and B frames would be reduced and high frequency details will be preserved. Since the entire GOP typically contains only one I frame, bias I frame bit budget will have only a small impact on the following P and B frame bit budgets when the whole GOP bit rate remains the same. This method is able to preserve the high frequency content and to yield significant quality improvement, especially at low encoding bit rate.

Method 200 starts in step 205 and proceeds to step 210. In step 210, method 200 obtains a complexity measure for each picture or frame type. (1) For example, after a picture of a certain type (I, P, or B) is encoded, the respective "complexity measure" ($X_i$, $X_p$, or $X_b$) is updated or calculated as:

$$Xi = Si \times Qi;$$

$$Xp = Sp \times Qp;$$

$$Xb = Sb \times Qb;$$

where Si, Sp, Sb are the number of bits generated by encoding this picture and Qi, Qp and Qb are the average quantization level or parameter computed by averaging the actual quantization values used during the encoding of the all the macroblocks, including the skipped macroblocks. Although the present invention discloses one particular method of obtaining the complexity measure for each picture type, other methods can be used to calculate the complexity measure.

In step 220, method 200 uses the complexity measure to calculate a bit budget for each picture type. In one embodiment, the method calculates the bit budget for each I, P and B frame depending on the estimated I, P and B complexity (as described in step 210). For example, the bit rate control method calculates the target bit budget of the corresponding frame type as follows:

For I frame: $I\_target\_bitrate = (bit\_rate)/(1 + (Np*Xp/Xi) + (Nb*Xb/Xi))$;

For P frame: $P\_target\_bitrate = (bit\_rate)/(Np + (Xi/Xp) + (Nb*Xb/Xp))$;

For B frame: $B\_target\_bitrate = (bit\_rate)/(Nb + (Xi/Xb) + (Np*Xp/Xb))$;

where Np and Nb represent the number of P and B frames in one group of pictures (GOP), and the bit_rate is the number of bits assigned to the Group of Pictures (GOP).

In step 230, method 200 obtains an average quantization level over non-intra (or inter) coding frames (P and B frames) for a previous GOP. For example, if a previous GOP has 11 frames comprising of one I frame, five (5) P frames and five (5) B frames, then the average quantization level over non-intra coding frames is computed over only the P and B frames. Additionally, if the quantization level for the P frames are 20 and the quantization level for the B frames are 30, then the average quantization level over non-intra coding frames is $25 = ((5 \times 20) + (5 \times 30))/10$.

It should be noted that an input image sequence is typically segmented into a plurality of GOPs. If the present invention is encoding a "current GOP", then a "previous GOP" is a previous GOP that has been previously encoded. Typically, a previous GOP is an immediate GOP that has just been encoded before the current GOP. However, the present invention is not so limited, so that the "previous GOP" need not be an immediate previous GOP.

In step 240, method 200 queries whether bias should be applied towards the bit budget computed for the I frame in the GOP. In one embodiment, whether bias will be applied is premised on a predefined threshold based upon the average quantization level over non-intra coding frames of a previous GOP. If the query is negatively answered, then method ends in step 255, if the query is positively answered, then method 200 proceeds to step 250. in one embodiment, whether bias is applied is premised on a predefined threshold.

In one embodiment, an I frame bias factor $\alpha$ is determined on the basis of quantization level (QL). If the QL over the non-intra coding frames of a previous GOP exceeds a predefined threshold, then the present invention will bias the I frame bit budget by using the bias factor $\alpha$. Specifically, the bias factor is applied such that the I frame within a current GOP will be assigned more bandwidth, whereas P and B frames' target bitrate budgets will be reduced accordingly. In one embodiment, the predefined threshold is set as follows:

if ( QL > 35) $\alpha$ = 3;
else if (QL > 25) $\alpha$ = 2.5;
else if (QL > 15) $\alpha$ = 2;
else $\alpha$ = 1.

In the example above, if the QL is less than or equal to 15, then the present invention will not bias toward the I frame bit budget to receive more bits. However, if the QL is greater than 15, then the present invention will bias toward the I frame bit budget to receive more bits. In one embodiment, several tiers of bias factor $\alpha$ are provided above. It should be noted that predefined threshold and the various tiers of bias factor $\alpha$ can be adapted to different values depending on the requirements of a particular implementation. As such, the present predefined threshold and the various tiers of bias factor $\alpha$ are only illustrative of the present invention.

In step 250, method 200 applies the bias factor $\alpha$ to bias toward the I frame bit budget to receive more bits. In one embodiment, the bias factor $\alpha$ is applied to generate new target bit rates or bit budgets, For example, the new target bit rate for each frame can be revised as follows:

For $I$ frame: $I\_target\_bitrate=(bit\_rate)/((Np*Xp/(Xi*\alpha))+(Nb*Xb/(Xi*\alpha)))$;

For $P$ frame: $P\_target\_bitrate=(bit\_rate)/(Np+(Xi*\alpha)/Xp+(Nb*Xb/Xp))$;

For $B$ frame: $B\_target\_bitrate=(bit\_rate)/(Nb+(Xi*\alpha)/Xb+(Np*Xp/Xb))$.

Once the new target bit rates or bit budgets are calculated, they can then be used in the rate control module of the encoder 100 to encode the I, P, and B frames of the present GOP. This method can then be repeated for the next GOP and so on.

In one embodiment, if the current I frame in the present GOP is a scene change frame, then the previous average QL may not be creditable for the current GOP. Therefore, the I frame bias factor $\alpha$ will be reset to 1 until the end of the current GOP. Namely, since the current I frame is a scene change, then the GL for a previous GOP is no longer informative as to the complexity of the present GOP. As such, there is no need to bias toward the bit budget of the present I frame.

Figure 3:
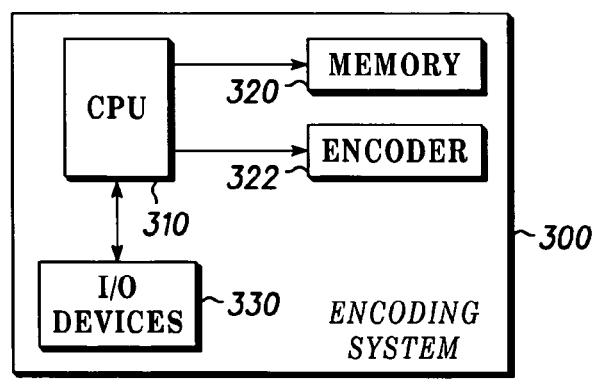
FIG. 3 illustrates the present invention implemented using a general purpose computer.

FIG. 3 is a block diagram of the present encoding system being implemented with a general purpose computer. In one embodiment, the encoding system 300 is implemented using a general purpose computer or any other hardware equivalents. More specifically, the encoding system 300 comprises a processor (CPU) 310, a memory 320, e.g., random access memory (RAM) and/or read only memory (ROM), an encoder 322 employing the present method of biasing towards the I Frame bit budget, and various input/output devices 330 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the encoder 322 can be implemented as physical devices or subsystems that are coupled to the CPU 310 through a communication channel. Alternatively, the encoder 322 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 320 of the computer. As such, the encoder 322 (including associated data structures and methods employed within the encoder) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for computing a plurality of bit budgets for an encoder for a plurality of different frame types in a current group of pictures (GOP), where said current GOP comprises at least one of: an intra coding frame and at least one inter coding frame, comprising:

determining a complexity measure for said intra coding frame and a complexity measure for said at least one inter coding frame;

calculating a bit budget for said intra coding frame and at least one bit budget for said at least one inter coding frame;

obtaining an average quantization level (QL) over only inter coding frames in a previous group of pictures (GOP);

determining whether said average quantization level has exceeded a predefined level; and allocating an additional amount of bits to said bit budget for said intra coding frame if said predefined level has been exceeded.

2. The method of claim 1, further comprising:

reducing said at least one bit budget for said at least one inter coding frame by said additional amount of bits.

3. The method of claim 1, wherein said at least one inter coding frame comprises at least one P frame and at least one B frame; and wherein said at least one bit budget for said inter coding frame comprises at least one P frame bit budget and at least one B frame bit budget.

4. The method of claim 3, wherein said complexity measure (Xi) for said intra coding frame and said complexity measure (Xp, Xb) for said at least one inter coding frame are calculated as follows:

$$Xi = Si \times Qi;$$

$$Xp = Sp \times Qp;$$

$$Xb = Sb \times Qb;$$

where Si, Sp, Sb are actual number of bits generated by encoding a corresponding I, P, or B picture and Qi, Qp and Qb are corresponding average quantization level.

5. The method of claim 3, wherein said bit budget for said intra coding frame and said at least one bit budget for said at least one inter coding frame are calculated as follows:

I frame: $I\_target\_bitrate = (bit\_rate)/(1+(Np*Xp/Xi) + (Nb*Xb/Xi));$

P frame: $P\_target\_bitrate = (bit\_rate)/(Np+(Xi/Xp) + (Nb*Xb/Xp));$

B frame: $B\_target\_bitrate = (bit\_rate)/(Nb+(Xi/Xb) + (Np*Xp/Xb));$ where Np and Nb represent a number of P and B frames in said current GOP, and the bit_rate is a number of bits assigned to said current GOP.

6. The method of claim 3, wherein said allocating said additional amount of bits is performed in accordance with a bias factor $\alpha$.

7. The method of claim 6, wherein said bias factor $\alpha$ is selected as follows:

```
if ( QL > 35) α = 3;
else if (QL > 25) α = 2.5;
else if (QL > 15) α = 2;
else α = 1.
```

8. The method of claim 6, wherein said bit budget for said intra coding frame and said at least one bit budget for said at least one inter coding frame are calculated as follows:

I frame: $I\_target\_bitrate = (bit\_rate)/((Np*Xp/(Xi*\alpha)) + (Nb*Xb/(Xi*\alpha));$ P frame: $P\_target\_bitrate = (bit\_rate)/(Np+(Xi*\alpha)/Xp + (Nb*Xb/Xp));$ B frame: $B\_target\_bitrate = (bit\_rate)/(Nb+(Xi*\alpha)/Xb + (Np*Xp/Xb));$ where Np and Nb represent a number of P and B frames in said current GOP, and the bit_rate is a number of bits assigned to said current GOP.

9. The method of claim 1, wherein said method is implemented in a motion compensated encoder in accordance with a compression standard.

10. The method of claim 9, wherein said compression standard is Moving Picture Experts Group (MPEG)-2.

11. An encoding system for computing a plurality of bit budgets for a plurality of different frame types in a current group of pictures (GOP), where said current GOP comprises at least one of: an intra coding frame and at least one inter coding frame, said computing comprising:

determining a complexity measure for said intra coding frame and a complexity measure for said at least one inter coding frame;

calculating a bit budget for said intra coding frame and at least one bit budget for said at least one inter coding frame;

obtaining an average quantization level (QL) over only inter coding frames in a previous group of pictures (GOP);

determining whether said average quantization level has exceeded a predefined level; and allocating an additional amount of bits to said bit budget for said intra coding frame if said predefined level has been exceeded.

12. The encoding system of claim 11, further comprising:

reducing said at least one bit budget for said at least one inter coding frame by said additional amount of bits.

13. The encoding system of claim 11, wherein said at least one inter coding frame comprises at least one P frame and at least one B frame; and wherein said at least one bit budget for said inter coding frame comprises at least one P frame bit budget and at least one B frame bit budget.

14. The encoding system of claim 13, wherein said complexity measure (Xi) for said intra coding frame and said complexity measure (Xp, Xb) for said at least one inter coding frame are calculated as follows:

$$Xi = Si \times Qi;$$

$$Xp = Sp \times Qp;$$

$$Xb = Sb \times Qb;$$

where Si, Sp, Sb are actual number of bits generated by encoding a corresponding I, P, or B picture and Qi, Qp and Qb are corresponding average quantization level.

15. The encoding system of claim 13, wherein said bit budget for said intra coding frame and said at least one bit budget for said at least one inter coding frame are calculated as follows:

I frame: $I\_target\_bitrate = (bit\_rate)/(1+(Np*Xp/Xi) + (Nb*Xb/Xi));$

P frame: $P\_target\_bitrate = (bit\_rate)/(Np+(Xi/Xp) + (Nb*Xb/Xp));$

B frame: $B\_target\_bitrate = (bit\_rate)/(Nb+(Xi/Xb) + (Np*Xp/Xb));$ where Np and Nb represent a number of P and B frames in said current GOP, and the bit_rate is a number of bits assigned to said current GOP.

16. The encoding system of claim 13, wherein said allocating said additional amount of bits is performed in accordance with a bias factor $\alpha$.

17. The encoding system of claim 16, wherein said bias factor $\alpha$ is selected as follows:

```
if ( QL > 35) α = 3;
else if (QL > 25) α = 2.5;
else if (QL > 15) α = 2;
else α = 1.
```

18. The encoding system of claim 16, wherein said bit budget for said intra coding frame and said at least one bit budget for said at least one inter coding frame are calculated as follows:

I frame: $I\_target\_bitrate = (bit\_rate)/((Np*Xp/(Xi*\alpha)) + (Nb*Xb/(Xi*\alpha)));$ P frame: $P\_target\_bitrate = (bit\_rate)/(Np+(Xi*\alpha)/Xp + (Nb*Xb/Xp));$ B frame: $B\_target\_bitrate=(bit\_rate)/(Nb+(Xi*\alpha)/Xb+(Np*Xp/Xb))$;

where Np and Nb represent a number of P and B frames in said current GOP, and the bit_rate is a number of bits assigned to said current GOP.

19. An apparatus for computing a plurality of bit budgets for a plurality of different frame types in a current group of pictures (GOP), where said current GOP comprises at least one of: an intra coding frame and at least one inter coding frame, comprising:

means for determining a complexity measure for said intra coding frame and a complexity measure for said at least one inter coding frame;

means for calculating a bit budget for said intra coding frame and at least one bit budget for said at least one inter coding frame;

means for obtaining an average quantization level (QL) over only inter coding frames in a previous group of pictures (GOP);

means for determining whether said average quantization level has exceeded a predefined level; and means for allocating an additional amount of bits to said bit budget for said intra coding frame if said predefined level has been exceeded.

20. The apparatus of claim 19, further comprising:

means for reducing said at least one bit budget for said at least one inter coding frame by said additional amount of bits.

\* \* \* \* \*